(12) United States Patent
Svensson et al.

(10) Patent No.: US 8,893,909 B2
(45) Date of Patent: Nov. 25, 2014

(54) PRESSURE VESSEL FOR A HIGH PRESSURE PRESS

(75) Inventors: Lennart Svensson, Västerås (SE); Stefan Sehlstedt, Västerås (SE)

(73) Assignee: Avure Technologies AB, Vasteras (SE)

( * ) Notice: Subject to any disclaimer, the term of this patent is extended or adjusted under 35 U.S.C. 154(b) by 158 days.

(21) Appl. No.: 13/138,597

(22) PCT Filed: Mar. 11, 2009

(86) PCT No.: PCT/EP2009/001743
§ 371 (c)(1),
(2), (4) Date: Sep. 9, 2011

(87) PCT Pub. No.: WO2010/102644
PCT Pub. Date: Sep. 16, 2010

(65) Prior Publication Data
US 2011/0315692 A1     Dec. 29, 2011

(51) Int. Cl.
*B65D 6/00* (2006.01)
(Continued)

(52) U.S. Cl.
CPC ... *F17C 1/00* (2013.01); *F17C 1/06* (2013.01); *F17C 2203/00* (2013.01);
(Continued)

(58) Field of Classification Search
CPC ........... F16L 21/06; F16L 21/08; F16L 13/00; F17C 1/06; F17C 1/00; F17C 1/04; F17C 2260/011; F17C 2209/232; F17C 2203/06; F17C 2223/0123; F28F 9/02; F16J 12/00; B65D 53/00; B65D 25/02; B65D 7/38; B65D 7/48; B65D 1/16; B29C 35/0227; B28B 3/00; B28B 7/06; B23P 6/00
USPC ............. 220/4.12, 646, 648, 4.25, 4.24, 4.21, 220/4.06, 4.07, 589, 586, 587, 320, 319, 220/378, 581; 285/70, 76; 277/637, 644, 277/650, 602, 647, 613; 156/382, 352; 73/54
See application file for complete search history.

(56) References Cited

U.S. PATENT DOCUMENTS 261,086 A * 7/1882 Dummer ................. 285/411
(Continued)

FOREIGN PATENT DOCUMENTS

EP     1910604     3/1969
(Continued)

OTHER PUBLICATIONS

International Search Report.
(Continued)

*Primary Examiner* — Mickey Yu
*Assistant Examiner* — Gideon Weinerth
(74) *Attorney, Agent, or Firm* — Harness, Dickey & Pierce, PLC

(57) ABSTRACT

The present invention relates to a pressure vessel (1) for a high pressure press, wherein the pressure vessel comprising a first sub-cylinder (4), a second sub-cylinder (6), pre-stressing means (8), and a securing member (16). The first and the second sub-cylinders (4, 6) are axially connected to form a cylinder body (2) for enclosing a high pressure medium. The first sub-cylinder (4) is in an outer wall provided with a first seat (22) for receiving a first part (24) of the securing member (16) and the second sub-cylinder (6) is in an outer wall provided with a second seat (26) for receiving a second part (28) of the securing member (16). The securing member (16) is fitted in the first and second seats (22, 26). The securing member (16), and the first and second seats (22, 26) are arranged such that the securing member (16), and the first and second seats (22, 26) cooperate to prevent separating axial movement between the first and the second sub-cylinders (4, 6). The pre-stressing means (8) is provided around the envelope surface of the cylinder body (2) such that the cylinder body (2) is radially pre-stressed and such that the securing member (16) is locked in the first and second seats (22, 26).

15 Claims, 4 Drawing Sheets

(51) Int. Cl.
*B65D 1/16* (2006.01)
*F17C 1/00* (2006.01)
*F17C 1/06* (2006.01)
*F16L 21/06* (2006.01)
*F16L 21/08* (2006.01)
*B65D 6/32* (2006.01)

(52) U.S. Cl.
CPC ..... *F17C 2203/06* (2013.01); *F17C 2223/0123* (2013.01); *F16L 21/06* (2013.01); *F16L 21/08* (2013.01); *B65D 7/00* (2013.01); *B65D 7/38* (2013.01)
USPC ........ 220/4.12; 200/4.01; 200/4.21; 200/581; 200/589; 200/592; 200/646; 200/648; 200/4.25; 285/65; 285/70; 285/411; 285/365; 277/637; 277/644; 277/602; 277/650

(56) References Cited

U.S. PATENT DOCUMENTS

| | | | | |
|---|---|---|---|---|
| 295,295 | A | * | 3/1884 | Sinclair ...................... 220/23.83 |
| 429,660 | A | * | 6/1890 | Sullivan ........................ 220/688 |
| 459,907 | A | * | 9/1891 | Hogan .......................... 285/385 |
| 586,179 | A | * | 7/1897 | Hamlin ......................... 138/152 |
| 1,732,235 | A | * | 10/1929 | Joyce ............................ 220/240 |
| 1,863,122 | A | * | 6/1932 | Matthews ..................... 220/4.07 |
| 1,966,241 | A | * | 7/1934 | Furrer ............................ 220/581 |
| 2,243,240 | A | * | 5/1941 | Zerbe ............................. 196/133 |
| 2,280,501 | A | * | 4/1942 | Stephenson ................... 220/586 |
| 2,312,420 | A | * | 3/1943 | Kopf et al. .................... 220/586 |
| 2,372,290 | A | * | 3/1945 | Pawelsky et al. .............. 53/467 |
| 2,386,246 | A | * | 10/1945 | Mapes ........................... 228/155 |
| 2,685,979 | A | * | 8/1954 | Zeek et al. .................... 220/588 |
| 2,940,734 | A | * | 6/1960 | Harvey ....................... 165/134.1 |
| 2,970,719 | A | * | 2/1961 | Brady, Jr. ...................... 220/678 |
| 3,025,992 | A | * | 3/1962 | Humphrey ..................... 220/565 |
| 3,039,649 | A | * | 6/1962 | Aleck ............................ 220/683 |
| 3,047,191 | A | * | 7/1962 | Young ........................... 220/588 |
| 3,074,584 | A | * | 1/1963 | Dobell ........................... 220/591 |
| 3,132,618 | A | * | 5/1964 | Andrews et al. ............. 114/20.1 |
| 3,193,129 | A | * | 7/1965 | Pfluger et al. ................ 220/4.16 |
| 3,243,496 | A | * | 3/1966 | Silverstein ....................... 174/18 |
| 3,398,853 | A | | 8/1968 | Jorgensen |
| 3,414,297 | A | * | 12/1968 | Pollia ............................... 285/98 |
| 3,613,157 | A | | 3/1969 | Landa et al. |
| 3,508,677 | A | * | 4/1970 | Laibson et al. ................ 220/590 |
| 3,587,905 | A | * | 6/1971 | McFarland .................... 220/587 |
| 3,693,822 | A | * | 9/1972 | Thillet .......................... 220/592 |
| 4,040,372 | A | * | 8/1977 | Flanders ............................ 413/9 |
| 4,113,132 | A | * | 9/1978 | Steiner .......................... 220/648 |
| 4,219,125 | A | * | 8/1980 | Wiltshire et al. ............. 220/4.13 |
| 4,267,940 | A | * | 5/1981 | Wade ............................ 220/321 |
| 4,304,038 | A | * | 12/1981 | Yabu et al. ...................... 29/458 |
| 4,326,737 | A | * | 4/1982 | Lehmann ....................... 285/112 |
| 4,347,944 | A | * | 9/1982 | Moldrup ........................ 220/320 |
| 4,560,430 | A | * | 12/1985 | Watanabe et al. .............. 156/285 |
| 4,626,002 | A | | 12/1986 | Hagemeister et al. |
| 4,732,556 | A | | 3/1988 | Chiang et al. |
| 5,211,306 | A | * | 5/1993 | Delonge-Immik et al. ... 220/588 |
| 5,547,533 | A | * | 8/1996 | Berglund ...................... 156/175 |
| 5,640,751 | A | * | 6/1997 | Faria ........................... 29/525.02 |
| 6,736,407 | B2 | * | 5/2004 | Tremoulet et al. ............. 277/638 |
| 7,434,702 | B2 | * | 10/2008 | Yaita ............................... 215/44 |
| 7,565,802 | B2 | * | 7/2009 | Bergman et al. ................ 60/486 |
| 7,628,001 | B2 | * | 12/2009 | Lonneborg ...................... 53/425 |
| 7,770,750 | B2 | * | 8/2010 | Squalli .......................... 220/316 |
| 8,316,905 | B2 | * | 11/2012 | Sehlstedt et al. ............... 156/382 |
| 2003/0122322 | A1 | * | 7/2003 | Tremoulet et al. ............ 277/630 |
| 2004/0004314 | A1 | * | 1/2004 | Yoneda et al. ................. 266/249 |
| 2004/0026431 | A1 | * | 2/2004 | Jones ............................ 220/588 |
| 2004/0045970 | A1 | * | 3/2004 | Debecker et al. ............. 220/586 |
| 2007/0039968 | A1 | * | 2/2007 | Ting et al. ..................... 220/582 |
| 2007/0218160 | A1 | * | 9/2007 | Sehlstedt ................... 425/405.2 |
| 2007/0228037 | A1 | * | 10/2007 | Yoshiyama .................. 220/4.25 |
| 2007/0257045 | A1 | * | 11/2007 | Guillet et al. .................. 220/646 |
| 2008/0274383 | A1 | * | 11/2008 | Kanno et al. .................... 429/19 |
| 2009/0038487 | A1 | * | 2/2009 | Svensson ........................ 100/43 |
| 2009/0071965 | A1 | * | 3/2009 | Iida et al. ...................... 220/586 |
| 2010/0075200 | A1 | * | 3/2010 | Hatta ............................... 429/34 |
| 2010/0219185 | A1 | * | 9/2010 | Griffin et al. ................. 220/4.07 |
| 2012/0061061 | A1 | * | 3/2012 | Stiefvater et al. .......... 165/134.1 |
| 2013/0313266 | A1 | * | 11/2013 | Andernach et al. ........... 220/590 |
| 2013/0334232 | A1 | * | 12/2013 | Gardin .......................... 220/592 |
| 2013/0344190 | A1 | * | 12/2013 | Gardin ....................... 425/405.2 |
| 2014/0007635 | A1 | * | 1/2014 | Gardin et al. ..................... 72/54 |
| 2014/0034216 | A1 | * | 2/2014 | Cittadini Bellini et al. .... 156/86 |

FOREIGN PATENT DOCUMENTS

| | | |
|---|---|---|
| EP | 0310369 A1 | 4/1989 |
| EP | 1707346 A2 | 10/2006 |
| FR | 2558234 A1 | 7/1985 |
| GB | 305609 A | 2/1929 |
| JP | 56055154 | 5/1981 |
| JP | 1-164805 | 6/1989 |
| JP | 2000016386 A | 1/2000 |
| WO | WO-2005079966 A1 | 9/2005 |

OTHER PUBLICATIONS

Japanese Office Action dated Mar. 27, 2013 for corresponding Japanese Application No. 2011-553287 (full translation provided).
Third Party Observations dated Mar. 9, 2012. 2179809.1.

* cited by examiner

PRESSURE VESSEL FOR A HIGH PRESSURE PRESS

TECHNICAL FIELD OF THE INVENTION

The present invention relates to a pressure vessel for an high pressure press for use at high-pressure pressing.

BACKGROUND ART

During a high pressure pressing operation of an high pressure press, a pressure medium is pressurized to a very high pressure. The pressure medium is a fluid. High pressure presses can be used in various applications. A high pressure press can for example be used for forming of sheet metal parts into predetermined shapes by highly pressurizing a fluid provided in a closed pressure vessel and use as an exerting force onto an intermediate diaphragm or the like. If the high pressure press exerts an equal pressure on every side of the contents in the pressure vessel, the press is called an isostatic press. Isostatic presses can be used for compaction or densification of metallic or ceramic powders, for reduction of pores or voids in castings or sintered articles, for sterilization and preservation of food stuffs, etc. Depending on the temperature of the pressure medium during an isostatic pressing process, the process can be called a hot isostatic pressing (HIP), a warm isostatic pressing or a cold isostatic pressing (CIP).

A pressure vessel of a conventional high pressure press comprises a cylinder body. The cylinder body is closed by closure lids at the cylinder ends. A frame is arranged to hold the closure lids at the ends of the cylinder body.

To increase the ability of the pressure vessel to resist crack formation and propagation, the pressure vessel is commonly pre-stressed. The vessel can for example be pre-stressed by autofrettage, by shrinkage or by wire-winding.

The pressure level in the pressure vessel depends on the press type and the material to be pressed. In sheet metal forming, the press is typically designed for pressures up to 140 MPa, in CIP for between 100 MPa and 600 MPa and in HIP for up to 300 MPa.

A cylinder for a high pressure press is traditionally manufactured by forging. A cylindrical body is first casted and subsequently forged to form a cylinder body. After a heat treatment the cylinder body is machined into its final shape and dimension. To manufacture very large cylinders put high demands on the equipments for the forging-, heat treatment- and machining processes.

Recently the demand for larger and larger sizes of the articles to be pressed has increased, implying a demand for larger and larger presses. One alternative way of producing larger presses is the manufacturing of pressure vessels with a cylinder body comprising connected sub-cylinders. The cylinder body can then comprise two or more sub-cylinders arranged in connection with each other, whereby the dimension (axial length) of the cylinder body of the isostatic press is not limited by the manufacturing process of one single large cylinder.

Not only large presses would benefit from a cylinder body comprising connected sub-cylinders. Pressure vessels of a smaller size would with this construction have a shorter time of delivery.

To hold and seal the cylinders together in forming one cylinder body is related to problems as the construction must withstand very high pressures without leakage or pressure vessel collapsing.

SUMMARY OF THE INVENTION

An object of the present invention is thus to provide a pressure vessel for a high pressure press comprising axially connected sub-cylinders, which pressure vessel is arranged to achieve a reliable connection between the connected sub-cylinders.

The above object is achieved by a pressure vessel having the features defined in appended claim 1. Alternative embodiments are defined in the dependent claims.

A pressure vessel for a high pressure press according to the invention comprises a first sub-cylinder, a second sub-cylinder, pre-stressing means, and a securing member. The first and the second sub-cylinders are axially connected to form a cylinder body for enclosing a high pressure medium. The first sub-cylinder is provided with a first seat for receiving a first part of the securing member and the second sub-cylinder is provided with a second seat for receiving a second part of the securing member. The securing member is fitted in the first and second seats. The securing member, and the first and second seats are arranged such that the securing member, and the first and second seats cooperate to prevent separating axial movement between the first and the second sub-cylinders. The pre-stressing means is provided around the envelope surface of the cylinder body such that the cylinder body is radially pre-stressed and such that the securing member is locked in the first and second seats.

The pressure vessel according to the invention is advantageous in that a cylinder a of large pressure vessel can be manufactured by connected sub-cylinders of a shorter axial length, whereby the manufacturing of each cylinder becomes less problematic. As the sub-cylinders are of a shorter axial length, the manufacturing is less advanced and thereby less expensive. In some cases, the manufacturing can be performed geographically closer to the place of assembly as the manufacturing is of a more ordinary scale and therefore less cumbersome.

Additionally, it is now possible to manufacture even larger pressure vessels than previously, by connecting several sub-cylinders into one large cylinder body. Thereby very large details can be processed in the pressure vessel, or alternatively, a larger amount of articles can be processed in the same batch and thereby the throughput of each pressure vessel increased.

According to the invention, the axial connection between two sub-cylinders is based on a combination of, on one hand, the securing member and the first and second seats being configured and arranged to cooperate to prevent separating axial forces, and, on the other hand, the pre-stressing means being arranged to lock the securing member in the seats. In addition to hold the force absorbing securing member reliably in place in the seats, the pre-stressing means adds additional strength to the mechanical connectors (seats and securing member). Consequently, a reliable connection between two sub-cylinders is achievable with a pressure vessel according to the invention.

A pressure vessel of the present invention comprises a cylinder body which is closed at the ends by for example lids. One lid can for example be arranged to be opened and closed at loading the pressure vessel with objects or articles to be pressure treated in a pressure process of the pressure vessel.

The cylinder body and the lids are normally held in place by a framework. Thus, from the prior art it is known to hold a cylinder body and the lids thereof axially together by an external frame, which extends on the outside of the cylinder body from a lid at one end to a lid at the other end. A securing member of the present invention is arranged to connect two sub-cylinders to each other, whereby a sub-cylinder is connected to an adjacent sub-cylinder. Thus, a pressure vessel according to present invention will normally comprise an external frame for holding the lids in addition to the securing member.

The cylinder body of the pressure vessel is arranged to hold the articles to be high pressure treated. The cylinder body is normally filled up with a high pressure medium before a high pressure process begins. A pressure vessel according to the invention is adapted to operate at high pressures. The pressure level in the pressure vessel of the present invention depends on the press type and the material to be pressed. In sheet metal forming the press is typically designed for pressures up to 140 MPa, in CIP for between 100 MPa and 600 MPa and in HIP for up to 300 MPa.

The high pressure medium is normally a fluid, for example argon gas, oil or water.

A cylinder body, as used herein, generally refers to an open ended body having a substantially circular cross-section and cylinder walls.

An axial direction, for the purpose of the present application, is the direction along the central axis of the cylinder body. The radial direction is perpendicular to the axial direction and is thus directed radially in the cylinder body. A circumferential extension refers to a circular extension of the cylinder body, for example along an inner surface or around an outer surface.

The cylinder body of the present invention comprises two or more sub-cylinders. A sub-cylinder is a cylinder-shaped part. When one sub-cylinder is axially connected with another sub-cylinder a cylinder body is formed comprising the two sub-cylinders. Thus, the present invention is not limited to the use of two sub-cylinders, the cylinder body may comprise three, four, five or any other suitable number sub-cylinders.

The securing member of the present invention is a member arranged to hold, fasten, connect or secure the first and the second sub-cylinders together to prevent separating axial movement between the sub-cylinders.

According to an embodiment of the present invention, the securing member is located in connection to the joint between two sub-cylinders and thereby not requiring any additional space at the cylinder far from the joint. This is advantageous in that the rest of the pressure vessel design does not have to be adapted or redesigned from the one comprising a homogeneous cylinder body. The number of connected sub-cylinders is not restricted due to for example lack of connection space and the cylinder body can thus comprise several more than two connected sub-cylinders.

According to one embodiment, the axial extension of the securing member is preferably half of the axial extension of the two connected sub-cylinders. The extension of the securing member is more preferably 25% of the axial extension of two connected sub-cylinders. The extension of the securing member is most preferably even less. The extension is dimensioned such that the dimension of the securing member is sufficient to withstand the forces present in the wall pressure vessel during the high-pressure processes of the pressure vessel. This is advantageous in that as little as possible of the body of the sub-cylinders needs to be machined for providing the seats.

According to one embodiment of the invention, at least a portion of the cross section of the securing member is C- or Jaw-shaped. The jaws or the arms of the C are then arranged to engage a radially extending surface in the respective seat. The waist connecting the two jaws of the C is arranged to absorb tensile stresses transferred from the arms/jaws. The profile of the jaws can be of a round shape, of a sharp shape or a mixture thereof. The securing member can be of a shape comprising several jaws arranged along the axial direction of each sub-cylinder, engaged in corresponding seats of the sub-cylinders. The jaws are preferably arranged symmetrically on both sides of the joint between the sub-cylinders.

The securing member is in one embodiment comprising two or more individual circular-arc-shaped segments. Preferably the securing member comprises two or three circular-arc-shaped segments, but it can also comprise a large plurality of segments. Alternatively, the securing member can comprise discrete staple-like elements.

The securing member can have constant or varying cross section.

The securing member is in one embodiment be countersunk in the wall of the cylinder body such that the outer surface of the cylinder body is flush. A flush outer surface of the cylinder body is advantageous in that for example the force by the pre-stressing means applied around the envelope surface of the cylinder body will be evenly distributed. Stress concentrations increases the risk for fatigue and crack formations and therefore stress concentrations should be avoided or very well controlled in a high pressure vessel. The connection of the sub-cylinders can therefore be compact and space-effective. The securing member can thus be arranged in the sub-cylinders such that the shape of a homogenous cylinder can be maintained. This is advantageous in that the rest of the pressure vessel design does not have to be adapted or redesigned from the one comprising a homogeneous cylinder body.

The securing member is in one embodiment comprising one or several precision blocks. This is advantageous in that the size of the securing member can be adjusted such that it fits perfectly in the seat. The securing member is in one embodiment comprising segments that together form a closed ring when fitted in the first and the second seats, prior to application of the pre-stressing means. The securing member can for example be casted in one ring-shaped piece and subsequently divided into circular arc-shaped segments. Precision blocks can then be used to compensate for the material lost during the dividing.

According to one embodiment of the invention, the securing member comprises segments that together form a substantially unstressed closed ring when inserted in the seats of the sub-cylinder prior to application of the pre-stressing means. The seats are such arranged that the securing member is countersunk in the wall of the cylinder body such that the outer surface of the cylinder body is flush. This embodiment is advantageous in that, after application of the pre-stressing means, the securing member is radially pre-stressed to the same extent as corresponding portions of the cylinder body, whereby stress concentrations over and close to the securing member can be avoided The securing member is in one embodiment made of a metallic material for example a high-strength steel. The material of the securing member does preferably have material properties similar to the properties of the material of the cylinder body.

In an embodiment of the invention, the first and the second seats and the securing member extend circumferentially around the outer envelope surface of the cylinder body. This is advantageous in that the pressure can be evenly distributed around the cylinder with a minimum of pressure concentrations.

The connection between the securing member, and the first and the second seat, respectively is in one embodiment a form fit connection. A form fit connection is advantageous as air pockets or other irregularities tend to deform in an uncontrolled manner during a pre-stressing or during high pressure processes, whereby the risk for crack formation increases.

In one embodiment of the invention, a radially outward directed protrusion is provided in the first and second seats, respectively. The first and second parts of the securing members are arranged in the seats to embrace the radially outward directed respective protrusion. The radially directed contact surfaces, one between the first part of the securing member and the first seat and one between the second part of the securing member and the second seat, transfers tension stresses to the portion of the securing member which is arranged in between the first and the second part. The tension stresses are absorbed by the material of the securing member and thereby the securing member prevents separating axial movements between the first and the second sub-cylinders.

The securing member is preferably arranged symmetrically over the joint between the sub-cylinders to be connected. Thereby the forces are evenly distributed and furthermore the manufacturing is simpler.

However, embodiments wherein the seats and the securing member cooperate to prevent axial separation of the sub-cylinders by means of friction forces in addition to a form fit connection are also conceivable. For example, the contact surfaces between the seats and the securing member can be provided with suitable surface roughness.

Pre-stressing means are provided around the envelope surface of the cylinder body of the present invention such that the cylinder body is radially pre-stressed. The securing member is locked in the first and the second seats by the pre-stressing means. The pre-stressing means can be wire winding or shrinkage or any other pre-stressing means.

In an embodiment of the invention, the pre-stressing means is band or wire shaped and is wound radially around said envelope surface of the cylinder body. The band or wire can have a circular, elliptical, square, rectangular or similar cross-sectional shape. The band or the wire is wound in a helical manner from one end of the cylinder to the other and back. Each winding from one end to the other forms a separate pre-stressing layer, and the entire pre-stressing arrangement comprises at least one layer, preferably more.

In an embodiment of the invention the inner wall of the cylinder body is provided with a sealing arrangement for sealing of the joint between the first and the second sub-cylinder to prevent pressure medium from leaking out of the cylinder body through the joint. By placing a sealing arrangement on the inner wall of the cylinder body, the pre-stressing of the cylinder body can be utilised to compress the sealing and the sealing contact.

In one embodiment of the invention the sealing arrangement is comprising a ring shaped sealing band, a first circumferential protruding flange, which is arranged on the inner wall of the first sub-cylinder and which axially extends from the joint and away from the second sub-cylinder, a second circumferential protruding flange, which is arranged on the inner wall of the second sub-cylinder and which axially extends from the joint and away from the first sub-cylinder; wherein the sealing band, in mounted position, is located concentrically within the first and the second protruding flanges such that it in a radially pre-stressed manner abuts against the first and second protruding flanges and sealingly overlaps the joint between the first and the second sub-cylinder, and wherein the sealing arrangement further comprising a first circumferential mounting space, which is arranged in the inner wall of the first sub-cylinder and which axially extends from the first protruding flange and away from the second sub-cylinder, for facilitating exchange of components of the sealing arrangement.

An advantage with the sealing arrangement being arranged for sealing the joint between the first and the second sub-cylinder is that pressure medium is prevented from leaking out through the joint. Pressure medium in the joint is disadvantageous of many reasons, and one is that the pressure medium will transfer a separating force in the axial direction in the joint. Thus, a well functioning sealing will contribute to the reliability of the interconnection of the sub-cylinders by reducing the strength of separating forces present in the joint. Another reason is of cause the loss of pressure in the pressure vessel and thereby the loss of control of the high pressure process.

In further another embodiment of the invention, the securing member is arranged with at least one through drain hole with an inlet at the joint between the first and the second sub-cylinder, extending radially through the securing member.

The joint between the first and the second sub-cylinder is in one embodiment provided with at least one radial drain channel extending from the sealing arrangement at the inner side of the cylinder body, radially through the cylinder body and to the inlet of the through drain hole of the securing member.

A drain channel is in an embodiment arranged in the axial direction of the cylinder body between the cylinder body and the pre-stressing means. One example of such construction is to arrange rods around the envelope surface of the cylinder body. The spaces between the rods and the envelope surface of the cylinder body, when the rods are arranged along the outer surface of the cylinder body, are then forming drain channels in the axial direction of the cylinder body. The rods can be of a circular through cut, but are preferably edged and most preferably 6-edged.

The cross-sectional area of the drain hole and the drain channels is in one embodiment such arranged that a leaking flow of pressure medium leaking out of the cylinder body via the joint between the first and the second sub-cylinder and into a radial drain channel, a drain hole and an axial drain channel, will follow a path with equal or expanding cross-sectional area. This is to reduce the flow resistance in the direction of drain flow such that for example forces acting in the separating direction of the sub-cylinders are avoided.

The drain arranged in the pressure vessel is advantageous in that a leakage can be observed in an early stage. The leakage control is important of safety and performance reasons. If a leakage is not noticed at an early stage, there is an increased risk for a pressure vessel collapse.

Generally, all terms used in the claims are to be interpreted according to their ordinary meaning in the technical field, unless explicitly defined otherwise herein.

Other objectives, features and advantages of the present invention will appear from the following detailed description, the attached dependent claims and from the appended drawings.

BRIEF DESCRIPTION OF DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS OF THE INVENTION

Figure 1:
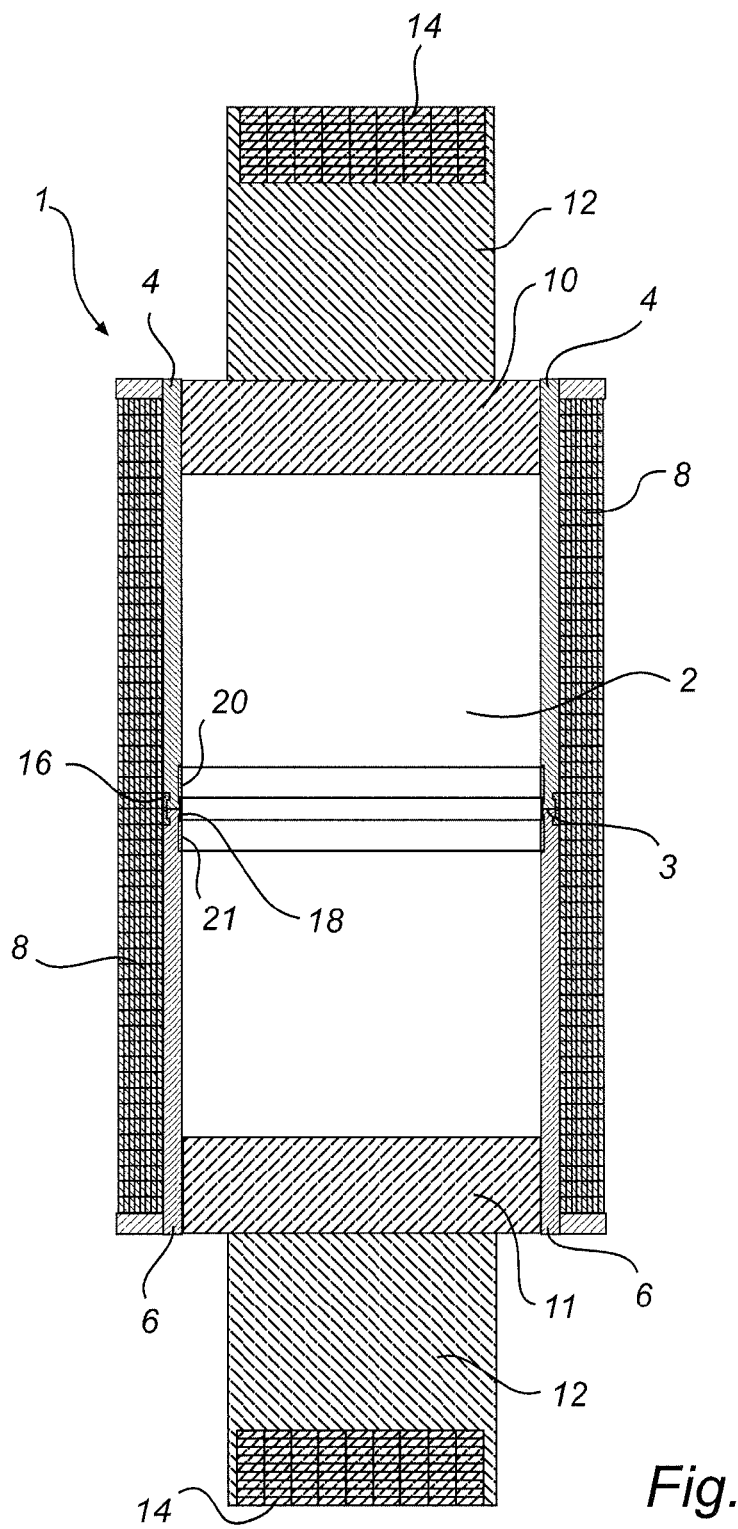
FIG. 1) is a schematic cross section view of a pressure vessel according to an embodiment of the invention, FIG. 2) is a schematic cross section view of the joint between two connected sub-cylinders according to an embodiment of the invention, and FIG. 3) is a schematic perspective view of two sub-cylinders and two circular-arc-shaped securing members according to an embodiment of the invention.

FIG. 1 is a schematic cross section view of a pressure vessel 1 according to one embodiment of the invention. The pressure vessel 1 comprises a cylinder body 2 of two connected sub-cylinders 4, 6. The cylinder body 2 is closed at the ends by lids 10, 11 which are hold in place by a framework 12. The cylinder body 2 is arranged to hold the articles to be high pressure treated.

The outer envelope surface of the cylinder body 2 is provided with a pre-stressing means in the form of a package of wound steel bands 8. The bands are wound tightly radially around the envelope surface of the cylinder body 2 to provide a radial compressive stress in the pressure vessel wall. The bands are wound in a helical manner from one end of the cylinder to the other and back. The band has a rectangular cross-sectional shape and is wound edge to edge. Each winding from one end to the other forms a separate pre-stressing layer, and the entire pre-stressing means comprise several layers of wound steel bands.

The framework 12 is also provided with a package of wound steel bands 14 to assist the framework 12 in taking up axial loads. To open the pressure vessel 1, the framework 12 is moved in a direction perpendicular to the axial direction of the cylinder body 2, whereby a lid 10, 11 can be removed giving access to the inner side of the cylinder body 2.

The two sub-cylinders 4, 6 are axially connected by a securing member 16 which is hold in place by the radially pre-stressing means in the form of the package of wound steel bands 8 arranged around the envelope surface of the cylinder body 2.

The inner wall of the cylinder body 2 is provided with a sealing arrangement sealing the joint 3 between the two sub-cylinders 4, 6. The sealing arrangement is comprising a sealing band 18 axially hold in place by locking members 20, 21. The sealing arrangement is described in more detail below with reference to FIG. 2.

Figure 2:
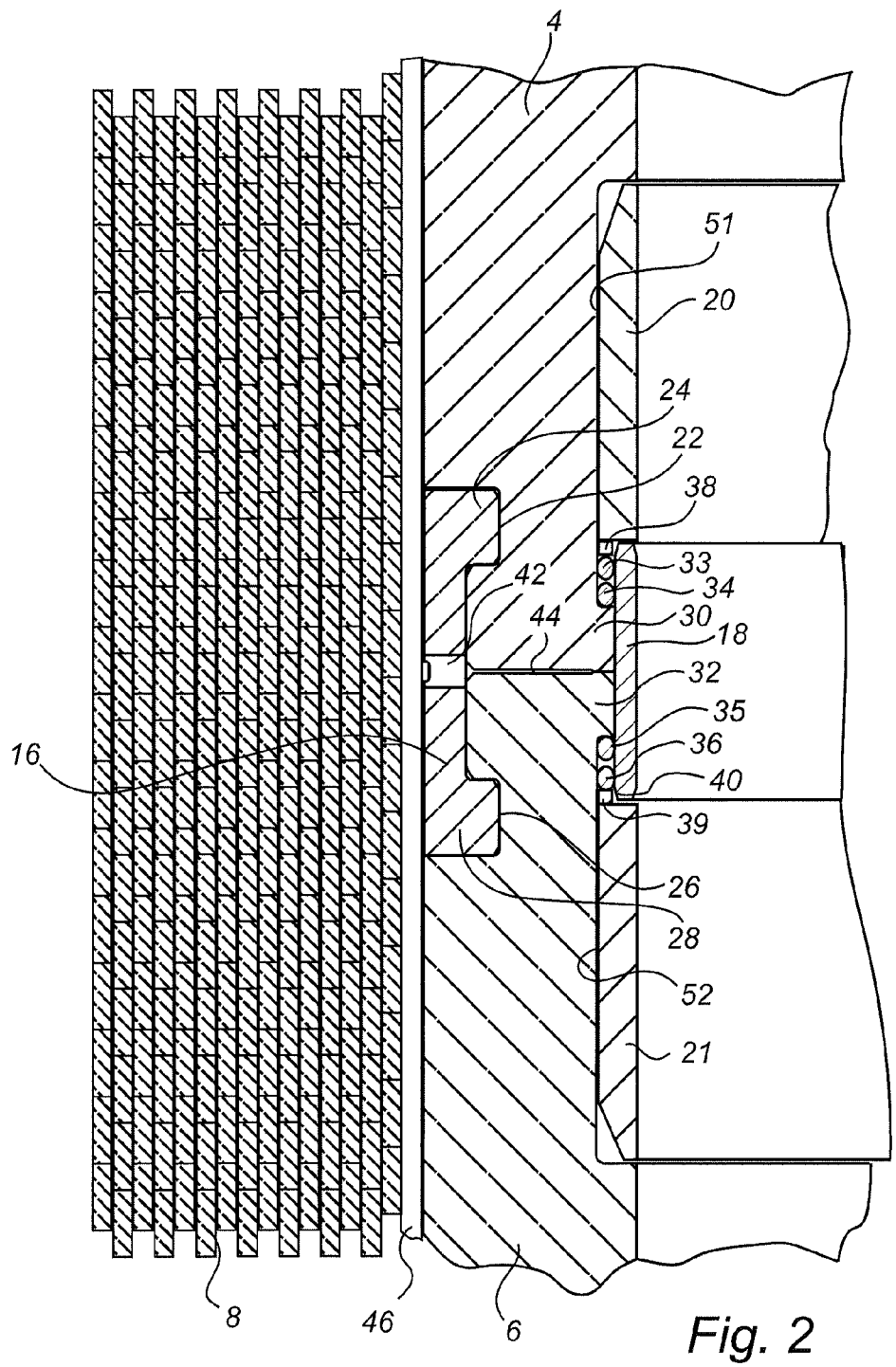

FIG. 2 shows a close up view of the joint 3 between the two sub-cylinders 4, 6 according to one embodiment of the invention. A wall of the cylinder body 2 and the package of wound steel bands 8 are shown in through cut at the area of the joint 3. A striped area represents a detail in through cut.

The two shown sub-cylinders 4, 6 are cylinder-shaped parts with a circular cross-section and the thickness of the sub-cylinder walls and the outer and inner diameter are of the same dimension.

A first seat 22 is arranged in the outer wall of the first sub-cylinder 4, and a second seat 26 is arranged in the outer wall of the second sub-cylinder 6. A securing member 16 is fitted in the first and second seats 22, 26 of the sub-cylinders 4, 6, symmetrically overlapping the joint 3 between the two sub-cylinders 4, 6. A fist part 24 of the securing member 16 is arranged in the first seat 22 of the fist sub-cylinder 4 and a second part 28 of the securing member 16 is arranged in the second seat 26 arranged in the second sub-cylinder 6.

The securing member 16 is C-shaped comprising two jaws 24, 28 connected by a waist. The jaws 24, 28 of the C is arranged to engage a radial extending surface in the seats 22, 26. The waist connecting the two jaws 24, 28 is arranged to absorb tensile stresses transferred from the jaws 24, 28. Axial forces tending to separate the first and the second sub-cylinders 4, 6 are absorbed by the material of the securing member 16. A part of the axial forces are absorbed by the friction at the interface between the securing member and the two connected sub-cylinders. The profile of the securing member 16 is of a sharp, right-angled shape provided with slightly rounded edges and corners.

The shape of the seats 22, 26 are adapted such that the connection between the securing member 16 and the seats 22, 26 of the sub-cylinders 4, 6 is a form fit connection. There is therefore a minimum of air pockets or irregularities present at the interface.

The securing member 16 is countersunk in the wall of the cylinder body 2 such that the outer surface of the cylinder body 2, comprising the two connected sub-cylinders, is flush. The first seat 22 is countersunk in the first sub-cylinder 4 and the second seat 26 is countersunk in the second sub-cylinder 28 such that the securing member 16 fit in the seats 22, 26 and such that the radially outermost surface of the securing member is parallel to and in the same level as the radially outermost surface of the two connected sub-cylinders, Thereby stress concentrations is avoided and the compressive stress exerted by the pre-stressing means is evenly distributed.

The pressure vessel 1 of this embodiment of the invention is further provided with a sealing arrangement arranged at the inner wall of the cylinder body 2, sealing the joint 3 between the two sub-cylinders 4, 6. The sealing arrangement comprises a sealing band 18, circumferential protruding flanges 30, 32 protruding from the inner wall of the first and the second sub-cylinders 4, 6 and mounting spaces 51, 52 arranged adjacent to the protruding flanges 30, 32. Each mounting space 51, 52 houses the part of the sealing band 18 that axially extend outside the protruding flange 30, 32, a locking member 20, 21, two o-rings 33, 34, 35, 36 and a spacer 38, 39.

The sealing band 18 is located concentrically at the first and second protruding flanges 30, 32 and in an radially pre-stressed manner abuts against the first and the second protruding flanges 30, 32 and sealingly overlaps the joint 3 between the first and the second sub-cylinder 4, 6.

The mounting space is circumferential and is arranged to facilitate exchange of components of the sealing arrangement. The dimension of a mounting space is sufficient to give access to the o-rings 33, 34, 35, 36 when the adjacent locking ring 20, 21 and spacer 38, 39 are removed, but while the sealing band 18 is in its mounted position. Furthermore, the sealing band 18 can be replaced by a new, unworn sealing band 18. The replacement of a sealing band is preformed by usage of a wedge shaped tool (not shown) on which a new sealing band 18 can be pushed to slide. The tool is at a replacement placed adjacent to a protruding flange, whereby a sliding ramp is formed between the larger diameter mounting space and to the protruding flanges of a smaller diameter. The sealing band 18 is thus forced into the elastically compressed state on the protruding flanges 30, 32, sealing the joint 3 between the two sub-cylinders 4, 6. The sealing band 18 is provided with a bevelled edge 40 which is arranged for sliding against the wedge shaped tool.

On each side of the sealing band 18, a locking ring 20, 21 in the form of a circlip is arranged to hold the sealing band 18 in the mounted position. Underneath the portion of the sealing band 18 that extends outside the protruding flange, the o-rings 33, 34, 35, 36 are provided acting as auxiliary sealing arrangements. Grease is provided inbetween two adjacent o-rings 33, 34, 35, 36 to act as a corrosion inhibitor. A spacer 38, 39 is arranged in the space between the outermost o-ring 33, 36 and the locker ring 20, 21 to prevent the o-rings 33, 34, 35, 36 from moving out of their sealing positions.

The securing member 16 is provided with a through drain hole 42 with an inlet at the joint 3 between the first and the second sub-cylinder 4, 6, extending radially through the securing member 16. Such through drain holes 42 arranged are at a frequent interval around the circumference of the securing member 16, see FIG. 3.

The joint 3 between the two sub-cylinders 4, 6 is provided with radial extending drain channels 44 extending from the sealing arrangement 18 at the inner side of the cylinder body 2, and radially through the cylinder body 2 and to the inlet of a through drain hole 42 of the securing member 16.

Figure 4:
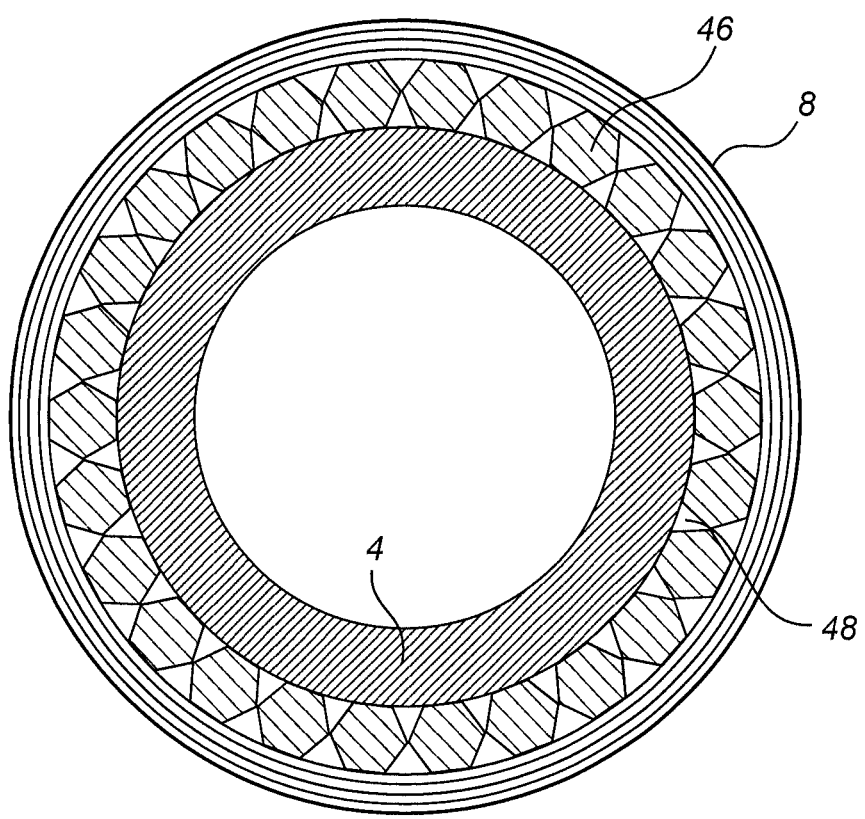
FIG. 4) is a cut-away view of the mid-section of the pressure vessel of FIG. 1.

6-edged rods 46 are arranged around the outer envelope surface of the cylinder body 2 inbetween the cylinder body 2 and the prestressing means. The rods 46 are places side to side around the cylinder body 2 whereafter the prestressing means are applied. An axial extending channel 48 is formed between each pair of adjacent rods 46 and the surface of the cylinder body 2 (see FIG. 4), whereby drain channels 48 are formed in the axial direction, along the envelope surface, of the cylinder body 2.

Ideally no leakage occurs out from the pressure vessel 1. However, if a leakage would occur at the sealing means, pressure medium would flow out of the cylinder body 2.

The leakage flow would follow a path, via the sealing means, first via the radial extending drain channel 44, then pass the through drain hole 42 and finally follow the axial extending drain channel. The diameters or cross-sectional area of the path of a leakage flow is arranged such that the flow will follow a path of a equal of expanding diameter or cross-sectional area. Thereby a pressure medium that has leaked out through the joint 3 will flow with low flow resistance and the separating forces acting on the sub-cylinders will be reduced. This drain arrangement makes it possible to notice a leakage at an early stage. Depending on the shape of the cross sectional area the size of the area may have to be aditionally adjusted to achieve the desired result of a low flow resistance.

Figure 3:
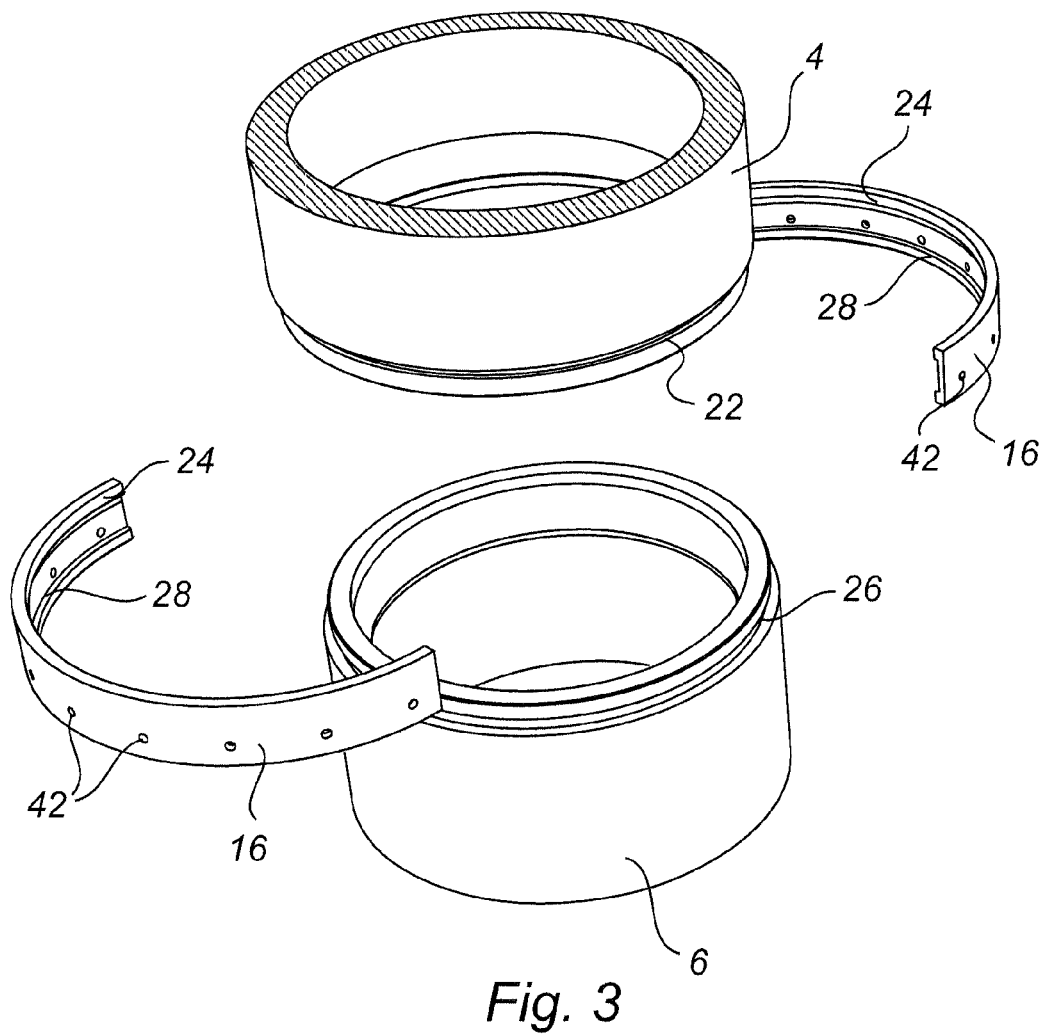

FIG. 3 is a perspective view of a first and a second sub-cylinder 4, 6 arranged with a respecive first and a second circumferential seat 22, 26 and a securing member 16 according to one embodiment of the present invention. The securing member 16 comprises two circular-arc-shaped segments. To assemble the cylinder body 2, the two sub-cylinders 4, 6 are brought together and subsequently the securing member 16 is brought into a mounted position, with the first part 24 of the securing member 16 in the first seat 22 of the first cylinder 4 and the second part 28 of the securing member 16 in the second seat 26 of the second sub-cylinder 6. A pre-stressing means (not shown in FIG. 3) arranged radially around the cylinder body 2 is used to hold the sequring member in position.

The two circular-arc-shaped segments form a closed ring when mounted in the seats of the connected sub-cylinders, prior to the appliance of the pre-stressing means. The compressive stress exerted by the pre-stressing means compresses therefore the securing member to the same extent as the rest of the cylinder body 2.

The invention claimed is:

1. A pressure vessel for a high pressure press, the pressure vessel comprising:
    a first sub-cylinder,
    a second sub-cylinder,
    a pre-stressing arrangement,
    a securing member, wherein
    the first and second sub-cylinders are axially connected to form a cylinder body having an outer envelope surface for enclosing a high pressure medium,
    the first sub-cylinder includes an outer wall provided with a first groove for receiving a first part of the securing member,
    the second sub-cylinder includes an outer wall provided with a second groove for receiving a second part of the securing member,
    the securing member is fitted in the first and second grooves,
    the securing member, and the first and second grooves are arranged such that the securing member, and the first and second grooves cooperate to prevent separating axial movement between the first and the second sub-cylinders, and wherein
    the pre-stressing arrangement is provided around the envelope surface of the cylinder body such that the cylinder body is radially pre-stressed and such that the securing member is locked in the first and second grooves, and
    a sealing arrangement on an inner wall of the first and the second sub-cylinders for sealing a joint between the first and second sub-cylinders, the sealing arrangement including,
        a ring shaped sealing band,
        a first circumferential protruding flange, which is arranged on the inner wall of the first sub-cylinder and which axially extends from the joint and away from the second sub-cylinder, and
        a second circumferential protruding flange, which is arranged on the inner wall of the second sub-cylinder and which axially extends from the joint and away from the first sub-cylinder.

2. The pressure vessel according to claim 1, wherein the first and the second grooves and the securing member extend circumferentially around the outer envelope surface of the cylinder body.

3. The pressure vessel according to claim 1, wherein there is a form fit connection between the securing member, and the first and second grooves, respectively.

4. The pressure vessel according to claim 1, wherein a radially outward directed protrusion is provided in the first and second grooves, respectively, and wherein the securing member is arranged to embrace the radially outward directed respective protrusion,
    such that the securing member prevents separating axial movement between the first and the second sub-cylinders.

5. The pressure vessel according to claim 1, wherein at least a portion of the cross section of the securing member is C-shaped.

6. The pressure vessel according to claim 1, wherein the securing member is comprising at least two individual circular-arc-shaped segments.

7. The pressure vessel according to claim 1, wherein the securing member is countersunk in the wall of the cylinder body such that the outer surface of the cylinder body is flush.

8. The pressure vessel according to claim 7, wherein the securing member form a closed ring when fitted in the first and the second grooves prior to the application of the pre-stressing arrangement, whereby, after application of the pre-stressing arrangement, the securing member is radially pre-stressed to the same extent as corresponding portion of the cylinder body.

9. The pressure vessel according to claim 1, wherein,
    the pre-stressing arrangement, in mounted position, is located concentrically around the first and the second protruding flanges such that it in a radially pre-stressed manner abuts against the first and second protruding flanges and sealingly overlaps the joint between the first and the second sub-cylinder, and wherein the sealing arrangement further comprising a first circumferential mounting space, which is arranged in the inner wall of the first sub-cylinder and which axially extends from the first protruding flange and away from the second sub-cylinder.

10. The pressure vessel according to claim 9, wherein the securing member is arranged with at least one through drain hole with an inlet at the joint between the first and the second sub-cylinder, extending radially through the securing member.

11. The pressure vessel according to claim 10, wherein the joint between the first and the second sub-cylinder is provided with at least one radial drain channel extending from the sealing arrangement at the inner side of the cylinder body, radially through the cylinder body and to the inlet of the through drain hole of the securing member.

12. The pressure vessel according to claim 1, further comprising at least one drain channel arranged in the axial direction of the cylinder body between the cylinder body and the pre-stressing arrangement.

13. The pressure vessel according to claim 11, wherein the cross-sectional areas of the drain hole and the at least one drain channels are such arranged that a leaking flow of pressure medium leaking out of the cylinder body via the joint between the first and the second sub-cylinder and into a radial drain channel, a drain hole and an axial drain channel, will follow a path with equal or expanding cross-sectional area.

14. The pressure vessel according to claim 1, wherein the securing member is made of a metallic material.

15. The pressure vessel according to claim 1, wherein the pre-stressing arrangement is band or wire shaped and is wound around said envelope surface of the cylinder body.

* * * * *